United States Patent [19]
Wicks, III

[11] 3,925,189

[45] Dec. 9, 1975

[54] PIPELINE PROCESSING OF OIL-CONTAINING SOLIDS TO RECOVER HYDROCARBONS

[75] Inventor: Moye Wicks, III, Houston, Tex.

[73] Assignee: Shell Oil Company, Houston, Tex.

[22] Filed: Jan. 29, 1971

[21] Appl. No.: 111,132

Related U.S. Application Data

[63] Continuation-in-part of Ser. No. 720,773, April 12, 1968, abandoned.

[52] U.S. Cl. .................. 208/11; 137/13; 302/66
[51] Int. Cl. ............................................. C10g 1/04
[58] Field of Search ............... 208/11, 370; 137/13; 302/66

[56] References Cited
UNITED STATES PATENTS

| | | | |
|---|---|---|---|
| 1,502,261 | 7/1924 | McArthur | 208/11 |
| 2,431,677 | 12/1947 | Brown | 208/11 |
| 2,885,275 | 5/1959 | Rees | 208/11 |
| 3,129,164 | 4/1964 | Cameron | 208/370 |
| 3,161,581 | 12/1964 | Tiedje et al. | 208/11 |

*Primary Examiner*—Curtis R. Davis

[57] ABSTRACT

A process and apparatus for the extracting of hydrocarbons from oil-containing solids e.g. tar sands and oil shale by forming an oil-containing solid-solvent slurry; injecting the slurry into a pipeline and flowing the slurry uphill in the pipeline at an angle of at least 2° with the horizontal while maintaining the slurry in suspension and at a relatively high flow velocity sufficient to leach and extract the hydrocarbon from the slurry by the time the slurry reaches the terminal end of the line.

8 Claims, 4 Drawing Figures

000
PIPELINE PROCESSING OF OIL-CONTAINING SOLIDS TO RECOVER HYDROCARBONS

CROSS-REFERENCE

This application is a contiuation-in-part of copending patent application, Ser. No. 720,773, filed Apr. 12, 1968 and now abandoned

BACKGROUND OF THE INVENTION

FIELD OF THE INVENTION

The invention relates to the processing of oil-containing soilds such as tar sands and oil shale to recover hydrocarbons therefrom; and, more particularly, to a process and apparatus for transporting tar sands from an open pit tar sand to a processing plant and partially recovering hydrocarbons in transit.

DESCRIPTION OF THE ART

The technical feasibility of transporting granular solids in the form of slurries by pipeline is well established, even for such dense materials as nickel powder. The concept is applicable to the transportation of such solids as coal, sulfur, potash and ores over distances of many miles, and to the conveying of a wide variety of solids within chemical and other processing plants.

Granular solids of varying sizes may be lifted or transported in a carrier liquid that has a lower specific gravity than the solids by confining the liquid and solids in the pipeline and supplying the lifting or transporting energy by making the velocity of the carrier liquid sufficient to overcome the tendency of the solids to settle in the liquid.

When oil-bearing solids such as oil bearing sands are processed to recover hydrocarbons therefrom, the raw material (i.e., the tar sand or rubblized oil shale) is usually transported from its point of origin to a processing facility where separation of the desired hydrocarbons is accomplished. Various methods may be used. For example, the solid e.g. tar sands may be transported in a truck-conveyor system with subsequent mixing tank processing to leach the hydrocarbons and to introduce necessary additives as other components for further recovery downstream.

SUMMARY OF THE INVENTION

It is an object of this invention to transport oil bearing solids such as tar sands and oil shale within a pipeline while partially recoverying hydrocarbons from the solid while flowing within the pipeline.

It is further object of this invention to lower significantly the total cost of transporting and processing oil bearing solids e.g. tar sands extracted from a subterranean formation.

It is a still further object of this invention to control the residence time of the solid in slurry form such as tar sands flowing within the piepline by varying the velocity and solids concentration in the pipeline.

The objects of this invention are carried out by recovering hydrocarbons from solids such as tar sands extracted from a subterranean formation by mixing the extracted solids in particle form such as tar sands or rubblized oil shale with sufficient solvent to form a solid (tar sand) solvent slurry. This slurry is flowed uphill while maintaining the slurry in suspension and at a relatively high flow velocity sufficient to partially leach and/or extract hydrocarbon from the slurry. Any remaining hydrocarbon or tar is then separated from the partially leached slurry.

In a preferred embodiment of the invention, any additives which might improve operations in the recovery area where any remaining tar is separated may be mixed prior to flowing the slurry into the recovery area.

DESCRIPTION OF THE PREFERRED EMBODIMENT

Figure 1:
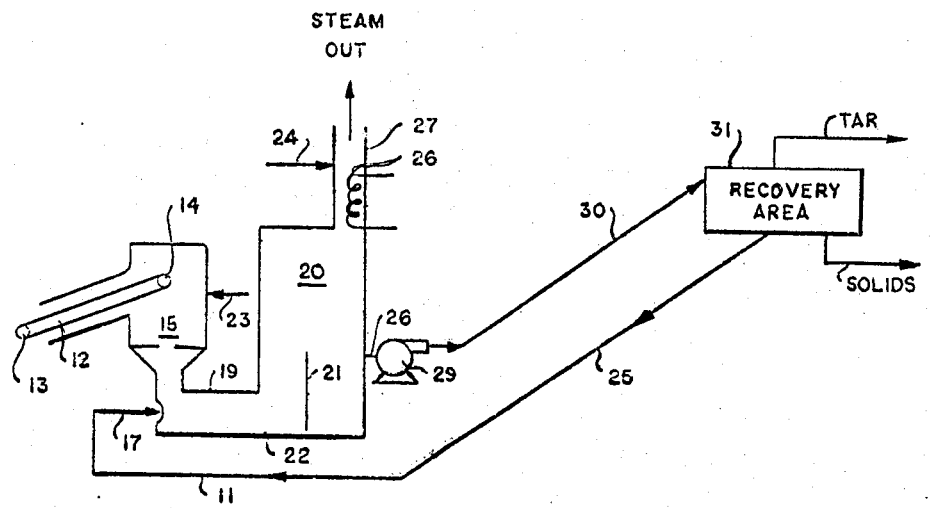
FIG. 1 is a schematic showing of a system of apparatus for practicing the invention which embodies the invention and which is advantageously used in practicing the process of this invention.

Referring to the drawing, the system 11 shown in FIG. 1 comprises a conveyor belt 12 driven by a pair of rollers 13 and 14, coupled to suitable motive means (not shown), for feeding hydrocarbon containing solids such as tar sands into a jet-type mixer 15. Hydrocarbon containing solids such as tar sands may be those which have been extracted from a subterranean formation, such as the Athabasca tar sands of Canada, Indian Knob tar sands in San Luis Obispo County, California, Utah's Green River Desert tar sand deposits, by any suitable means, such as open pit mining, or the Green River oil shale deposits of Colorado which on recovery must be rubblized into particles of 2–5000 microns suitable for forming a slurry with a suitable solvent.

Figure 2:
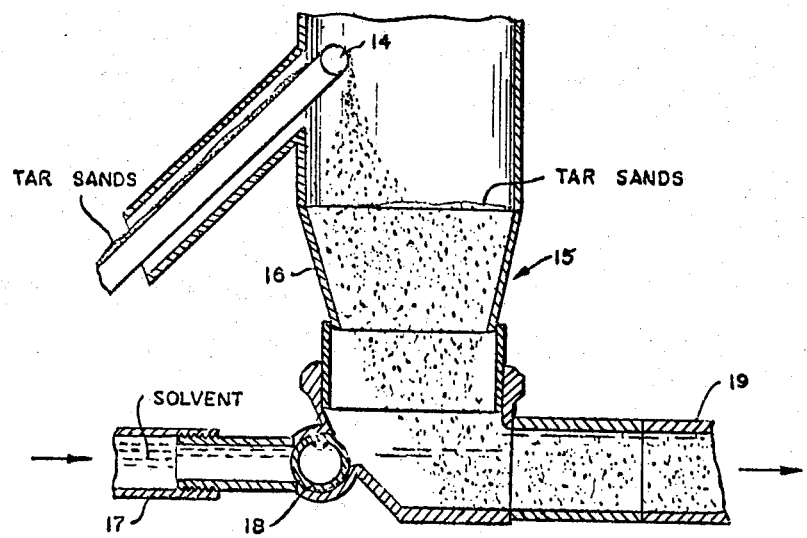
FIG. 2 is a detail of a portion of the apparatus of FIG. 1.

Mixer 15, as shown in detail in FIG. 2, includes a hopper 16 which communicates at its upper end with the upper portion of belt 12. Thus, tar sands carried by belt 12 are deposited into hopper 16 of mixer 15 as illustrated in FIG. 2. A suitable solvent such as an aromatic and/or aliphatic solvent e.g. toluene, benzene, xylene, phenol, aliphatic naphthas, e.g. Shell's Tolusol having the following properties: specific gravity at 60°F – 0.737; distillation range °F - 205–220; anilene cloud point °F – 120; aromatic - 11%v; is introduced under pressure through inlet 17 past flow valve 18 where it mixes with the tar sands from hopper 16 to form a tar sands-solvent slurry. This slurry is removed from mixer 15 through outlet 19.

From outlet 19, the slurry preferably passes into a surge tank 20 (FIG. 1) so as to provide an opportunity for vapor disengagement from the slurry and also give some additional contact time for tar leaching. Tank 20 consists of a substantially cylindrical vessel having a baffle plate 21 across its diameter and extending vertically upward from the lower wall 22 of tank 20. Tank 20 and baffle 21 are preferably of stainless steel. In order to exclude air from both mixer 15 and tank 20, purge stream inlets 23 and 24, for introducing oxygen-free gas, communicate with the interiors of mixer 15 and tank 20, respectively. Any suitable inert gas may be used e.g. steam, $N_2$, $CO_2$ etc; however, steam is preferred since a small amount may be added to the slurry so as to improve filtration rates. If it is found that steam condensate from the steam introduced into mixer 15 causes the tar sand particles to stick together, nitrogen may be used as the mixer purge gas and small amounts of water can be introduced as liquid into the solvent return line 25 or into mixer 15 directly by any suitable means so as to achieve correct proportions of tar sands and solvent in the slurry. A vapor condenser 26 is preferably located in a steam outlet 27 which communicates with the interior of tank 20 for minimizing solvent losses and permitting inert gases to leave system 11.

A surge tank outlet 28 communicates with tank 20 for removing the slurry therefrom; the slurry is flowed through suitable pumping means 29 and is preferably pumped uphill (i.e., at an angle to the horizontal of 2°–45° and preferably between 5° and 15°) along a slurry pipeline 30 of 2–40 inch diameter, preferably 6–24 inch diameter, the slurry flowing at a velocity within the range of 3–20 ft/sec which can be several thousand feet to several miles e.g. 1,000–15,000 feet to a recovery area 31.

As will be discussed further hereinbelow, any remaining tar and solids will be recovered from the slurry at the recovery area 31. Solvent return line 25 communicates with the recovery area 31 for removing solvent therefrom under gravity flow. The solvent return line 25 communicates with inlet 17 for introducing solvent back into mixer 15.

As an example of the operation of the invention, tar sands extracted from the subterranean formation are fed from conveyor belt 12 into mixer 15. As shown in FIG. 2, the tar sands are mixed with a suitable solvent introduced under pressure through inlet 17. In this manner, a tar sands-solvent slurry is flowed out of mixer 15 through outlet 19.

The slurry is then flowed into surge tank 20 at a velocity sufficient to keep all of the slurry in suspension. For example, a 15 foot diameter cylindrical surge tank, 14 feet high, at high capacity provides 60 seconds surge time at maximum flow and thus 60 seconds contact time for tar desorption from the sand. In this manner, tar is partially leached from the slurry and condensed vapors are removed through outlet 27.

The partially leached slurry is then preferably pumped uphill at relatively high flow velocities through a slurry pipeline 30 to the recovery area 31. The residence time of the slurry in the pipeline 30 promotes further leaching of the tar from the tar sands in the slurry. At the recovery area 31, any remaining tar is recovered from the slurry by means well known in the art. The solids (i.e., the sand and other "waste" materials) are also recovered and removed at the recovery area 31.

The slurry flowing within pipeline 30 can flow in a variety of ways or flow regimes dictated primarily by average flow velocity, particle size and weight, fluid properties and pipe size and orientation. In horizontal flow, above some velocity $V_{TRANS}$, for example, a given slurry will flow in a completely mixed or homogeneous fashion with no average concentration changes across the pipe. Below this velocity, the flow is heterogeneous with some measurable increase in concentration towards the bottom of the pipe. If the velocity is further decreased, solids can flow by bouncing and rolling along the bottom of the pipe and this is called saltation flow. At still lower velocities, if solids are continuously injected into the pipeline, plugging will occur. Correlations have been proposed for the transitions discussed hereinabove, especially for $V_{TRANS}$. The following equation has been proposed by R. Durand and given in the book "The Transportation of Solids in Steel Pipelines", Colorado School of Mines Research Foundation, Inc., Golden, Colo. (1963).

$$V_{TRANS} = [1800 \, g_L D V_S]$$

Particle settling velocity, $V_S$, is calculated, by, in general, trial and error solution of the following equations:

$$V_S = \sqrt{\frac{4_{oL} d(\rho S - \rho L)}{3 C_{D \rho L}}}$$

$$C_D = f(Re_p)$$
$$Re_p = dV_{Sp}/\mu$$

These equations, together with the function $f(Re_p)$, are given in the [Chemical Engineers Handbook], J. H. Perry, McGraw-Hill, New York, Third Edition (1950).

For slurries with mixed particle size, Durand recommends that $V_S$ 20 be calculated using the following weighted average particle size:

$$(C_D) \, avg = [\Sigma^n_{i=1} P_i \sqrt{C_{Di}}]^2$$

Figure 3:
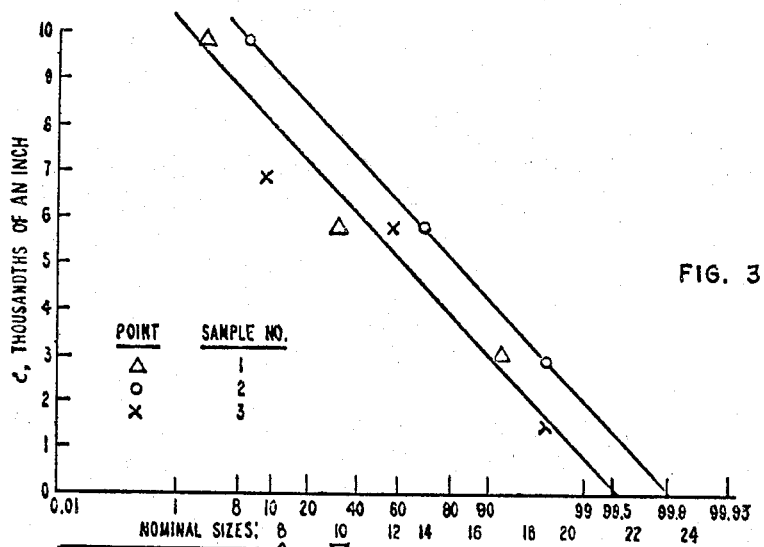
FIGS. 3 and 4 are graphical presentations for determining the transport and transition velocities required for the slurry in the system of FIG. 1.

The particle size distribution data from the following table have been plotted in FIG. 3. This graph shows the tar sand particle size distribution data pertaining to tar sands obtained from the Indian Knob tar sands in San Luis Obispo County, Calif. The straight line of FIG. 3 shows that the particle sizes are approximately normally distributed with a mean size of 5.18 and a standard deviation of 2.00 thousandths of an inch.

Table 1

| Tyler Mesh | Weight % On For Sample Number | | |
|---|---|---|---|
| | 1 | 2 | 3 |
| 20 | | | .02 |
| 30 | | | .02 |
| 40 | | | .05 |
| 45 | | | .05 |
| 60 | 1.3 | 3.7 | 1.21 |
| 80 | | | 8.29 |
| 100 | 28.5 | 53.9 | 35.85 |
| 140 | | | 38.89 |
| 200 | 59.3 | 37.2 | 5.21 |
| 325 | | | 5.15 |
| PAN | 10.9 | 5.2 | 5.26 |
| | 100.0 | 100.0 | 100.0 |

The following table shows the calculation of $V_S$ according to the Durand calculation. Accordingly, $d_{avg} = 3.5$ thousandths of an inch.

Table 2

| $P(d_{j+1})$ | $P(d_j)$ | ½($d_{j+1}+d_j$) Mils | $P_j$ | $V_S$, ft/sec | $Re_p$ | $C_D$ | $P_i \sqrt{C_D}$* |
|---|---|---|---|---|---|---|---|
| .72 | 2.7 | 9.5 | .020 | .0735 | 2.02 | 11.9 | .069 |
| 2.7 | 7.7 | 8.5 | .050 | .0589 | 1.45 | 16.6 | .204 |
| 7.7 | 17.6 | 7.5 | .099 | .0459 | 1.00 | 24.0 | .485 |
| 17.6 | 31.8 | 6.5 | .142 | .0344 | .649 | 37.0 | .865 |
| 31.8 | 51.7 | 5.5 | .199 | .0246 | .392 | 61.2 | 1.560 |
| 51.7 | 71.1 | 4.5 | .194 | .0165 | .215 | 112 | 2.06 |
| 71.1 | 86.3 | 3.5 | .152 | .00999 | .101 | 238 | 2.34 |
| 86.3 | 94.6 | 2.5 | .083 | .00509 | .0369 | 650 | 2.12 |
| 94.6 | 98.3 | 1.5 | .037 | .00183 | .00795 | 3,020 | 2.03 |

Table 2-continued

| $P(d_{j+1})$ | $P(d_j)$ | ½($d_{j+1} + d_j$) Mils | $P_j$ | $V_S$, ft/sec | $Re_p$ | $C_D$ | $P_i \sqrt{C_D}$* |
|---|---|---|---|---|---|---|---|
| 98.3 | 99.6 | .5 | .013 | .000204 | .000296 | 81,100 | 3.71 |

*$\Sigma_{p_i} \sqrt{C_{Di}} = 15.44$; $(C_D)_{avg} = 239$; $d(C_D) \cong 3.5$ mils; $V_S(d) = .0100$ ft/sec.

It has been proposed by K. E. Spells in "Correlations for Use in Transport of Aqueous Suspensions of Fine Solids Through Pipes," Trans. Inst. Chem. Eng. 33, 79 (1955) that, where $d_{15}$ is the $d$ at which 15% of the solids have larger particle size, the following formula holds true:

$$V_{TRANS} = \left[ .0741 \, g_t d_{15} \left( \frac{D\rho_M}{\mu_L} \right)^{.775} \left( \frac{\rho_S - \rho_L}{\rho_L} \right) \right]$$

Figure 4:
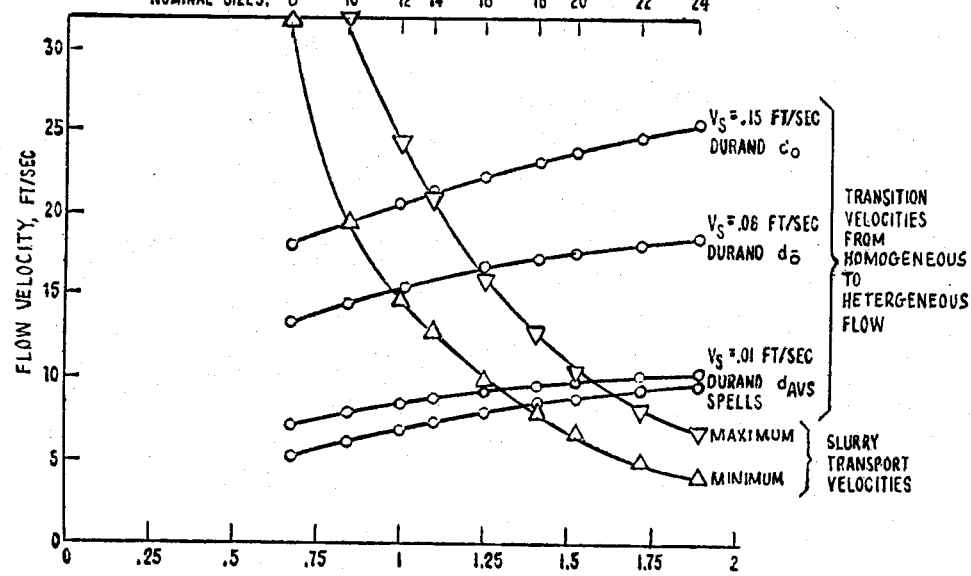

The value S of $V_{TRANS}$ predicted by correlations of Durand and Spells as a function of pipe diameter are shown in FIG. 4 and the following table along with design transport velocities. The transport velocities are calculated from the minimum slurry transport rate of 11.9 and 19.6 cubic feet of slurry per second and nominal pipe sizes from 8 to 24 inches. The actual inside diameters are shown on the abscissa in FIG. 4 and in the following table as corresponding to wall thicknesses sufficient to hold 1,000 psig.

inch diameter or smaller. If particle sizes are much larger than shown in FIGS. 3, smaller pipe sizes may be required.

Assuming from the foregoing that a homogeneous flow prevails, pressure drop calculations may be made for all pipe sizes. These results are shown in Table 3 discussed hereinabove and also show the total pressure drop and hydraulic horsepower requirements for minimum and maximum conditions as follows:

|  | Min | Max |
|---|---|---|
| Tar Sand Flow Rate, tons/stream day | 34,000 | 56,000 |
| Fluid viscosity, centistokes | 3 | 4 |
| Lift, ft | 300 | 600 |
| Length, ft | 3,500 | 5,000 |

These calculations employ the usual friction factor-Reynolds number relationship with the density taken as that of the slurry and the viscosity that of the liquid carrier. A comparison of Table 3 and FIG. 4 shows that Table 3

| D Nom. in. | I.D., in. | V, ft/sec Min | V, ft/sec Max | $V_{TRANS}$, ft/sec Durand $d_{avg}$ = 3.5 mils | $V_{TRANS}$, ft/sec Spells | $(\Delta P/\Delta L)_F$, psf/ft Min | $(\Delta P/\Delta L)_F$, psf/ft Max | $\Delta P_{TOTAL}$, psi Min | $\Delta P_{TOTAL}$, psi Max | hhp Min | hhp Max |
|---|---|---|---|---|---|---|---|---|---|---|---|
| 8 | 8.219 | 32.3 | 53.1 | 7.36 | 5.21 | 19.8 | 49.4 | 686 | 2120 | 2140 | 10,900 |
| 10 | 10.054 | 19.6 | 32.3 | 7.85 | 5.91 | 7.43 | 18.4 | 386 | 1049 | 1210 | 5,390 |
| 12 | 12.192 | 14.7 | 24.2 | 8.41 | 6.67 | 2.91 | 7.19 | 276 | 659 | 861 | 3,380 |
| 14 | 13.188 | 12.6 | 20.7 | 8.64 | 7.02 | 1.98 | 4.88 | 253 | 579 | 789 | 2,970 |
| 16 | 15.188 | 9.45 | 15.5 | 9.02 | 7.68 | .997 | 2.45 | 229 | 495 | 715 | 2,540 |
| 18 | 16.876 | 7.68 | 12.6 | 9.35 | 8.20 | .599 | 1.46 | 220 | 461 | 686 | 2,370 |
| 20 | 18.876 | 6.14 | 10.1 | 9.74 | 8.81 | .346 | .841 | 213 | 439 | 664 | 2,250 |
| 22 | 20.750 | 5.09 | 8.36 | 10.0 | 9.36 | .218 | .532 | 210 | 428 | 655 | 2,190 |
| 24 | 22.876 | 4.18 | 6.87 | 10.4 | 9.95 | .134 | .312 | 208 | 421 | 649 | 2,160 |

In FIG. 4, four curves of $V_{TRANS}$ are shown, one corresponding to Spells correlation using $d_{15} = 7.2$ mils and three corresponding to the Durand correlations using $d_{avg} = 3.5$ mils, $d_5 = 3.4$ mils and $d_o = 46$ mils. Below any of the curves, the flow is heterogeneous and above it is homogeneous. The Durand correlation curves using values corresponding to $d_5$ and $d_o$ are shown only to indicate the effect of particle size distribution variation which might be encountered in the tar sand deposit. From the foregoing, it can be seen that the Spells and Durand Correlations using $d_{avg}$ are in reasonably good agreement and may be taken as the basis for the design of pipeline 30.

From FIG. 4, for the particle size distributions shown in FIG. 3, where $d_{avg} = 3.5$ mils and $d_{15} = 7.2$ mils, homogeneous flow exists above the lower pair of $V_{TRANS}$ curves. Thus, homogeneous flow exists in pipes of 16 inch pipe instead of 16 inch provides more operational security at a cost of 14.5% more horsepower.

The solvent return line 25 (FIG. 1) may be sized to function by gravity alone at adverse conditions, as for example, a hill height of 300 feet and at maximum length, viscosity and flow rate of solvent. Preferably, slurry line 30 and solvent line 25 are of the same size for engineering economies, such as interchangeability, stock control, and ease of connecting. A solvent return line 25 of the same size as that used in the uphill solids line 30 returnes solvent to the mixer area at an advantageous pressure.

EXAMPLE

Based on a maximum tar sand flow of 56,000 tons per stream day, the following dimensions are preferred for the system disclosed herein.

| Item | Remarks |
|---|---|
| 1. Line 30 | 14-inch pipe with .406-inch wall thickness. |
| 2. Line 25 | 14-inch pipe with 0.406-inch wall thickness resulting in the obtaining of a solvent at a minimum of 60 psig pressure at the solids-liquid mixing point by gravity return of the liquid. |
| 3. Pumping means 29 | Two 1500 horsepower piston-type slurry pumps. |

-continued

| Item | | Remarks |
|---|---|---|
| 4. | Lift range of line 30 | 300 to 600 feet (at an angle of approximately 5° to 7° to the horizontal). |
| 5. | Pipe length range | 3,500 to 5,000 feet. |
| 6. | Tar sand | a) Flow rate range of 34,000 to 56,000 tons per stream day.<br>b) Solid specific gravity: 2.6.<br>c) Solid concentration in solvent: 40% by volume.<br>d) Particle size distribution: see Table I, above. |
| 7. | Solvent | Tolusol. |
| 8. | Slurry properties (Tolusol-tar liquid solution) | a) Viscosity: 3–4 centistokes at 80°F.<br>b) Specific gravity: 0.9. |

It can be seen from the foregoing that the transportation of tar sands in a liquid in which they are soluble enables tar sands to be transported from the area in which they were mined to a recovery area while leaching some of the hydrocarbons from the tar sands thereby lowering the recovery cost in the remainder of the process. Any additives which might improve the operations in the recovery area may be mixed during the transportation of the slurry. The residence time for leaching tar from the slurry may be controlled by varying the velocity and solids concentration in a given length and size pipeline. For open-pit mining operations, for example, the length of the pipeline is adjusted as required by merely adding more pipe length segments as the mining operations proceed.

The present invention is also applicable to extraction of oil from oil shale and in such cases the oil shale must be rubblized into small particles by any suitable means such as crushing, grinding, etc. slurried with a solvent such as phenol injected in a pipeline having an angle with the horizontal of 5° – 15° and maintaining the slurry in the pipeline at an elevated temperature (800° – 1500°F) sufficient to effect at lease partial extraction of the oil from the oil shale by the time the slurry reaches the terminal end of the line.

Although a preferred embodiment of the invention have been discussed minor variations and alterations may occur to one skilled in the art and it is to be understood that such modifications fall within the spirit and scope of the appended claims.

I claim as my invention:

1. An improved method of pipeline transporting and recovering hydrocarbons from tar sands comprising: mixing tar sands with sufficient solvent to form a tar sands-solvent slurry; holding the slurry while disengaging vapors therefrom; excluding air from said process during both the steps of mixing the tar sands with solvent, and while disengaging said vapors; and pipeline transporting said tar sands-solvent slurry; utilizing a pipeline between 8 and 24 inches in diameter, as a reactor by forming a tar sand-solvent slurry and injecting and maintaining the slurry at a critical velocity of between 3 and 20 feet per second into a pipeline, said pipeline being positioned uphill at an angle of between 5° and 7° to the horizontal, thereby effecting increase of solid holdup and residence time in the pipeline so as to effect maximum leaching and extraction of the hydrocarbons from the slurry by the time the slurry reached the terminal end of the pipeline.

2. The method of claim 1 wherein the hydrocarbon-containing solid is the group consisting of tar sands and oil shale and the solvent is selected from a liquid hydrocarbon.

3. The method of cliam 2 wherein the angle of the pipeline to the horizontal is between 5° and 15° and wherein the residence time of the slurry in the pipeline is partially controlled by adjusting the velocity of the slurry, said velocity being maintained within the range of from 3 to 20 ft/sec.

4. The method of claim 3 wherein the solid is tar sands and the solvent is an aliphatic naphtha.

5. The method of claim 3 wherein the solid is oil shale rubbilized into small particles, the solvent is an aromatic solvent and the slurry in the pipeline is maintained at an elevated temperature sufficient to effect extraction of the oil from the oil shale.

6. An improved method of pipeline transporting and recovering hydrocarbons from tar sands comprising: mixing tar sands with sufficient solvent to form a tar sands-solvent slurry; holding the slurry while disengaging vapors therefrom; excluding air from said process during both the steps of mixing the tar sands with solvent, and while disengaging said vapors; and pipeline transporting said tar sands-solvent slurry; utilizing a pipeline between 8 and 24 inches in diameter, as a reactor by forming a tar sand-solvent slurry and injecting and maintaining the slurry at a critical velocity of between 11.9 and 19.6 cubic feet per second into a pipeline, said pipeline being positioned uphill at an angle of between 5° and 7° to the horizontal, thereby effecting increase of solid holdup and residence time in the pipeline so as to effect maximum leaching and extraction of the hydrocarbons from the slurry by the time the slurry reached the terminal end of the pipeline.

7. The method of claim 6 wherein the leached or extracted hydrocarbons are separated from the slurry at the terminal end of the pipeline.

8. The method of claim 6 wherein the solvent is an aliphatic naphtha.

* * * * *